US006226847B1

(12) United States Patent
Breton

(10) Patent No.: US 6,226,847 B1
(45) Date of Patent: May 8, 2001

(54) EXTRACTOR TOOL

(76) Inventor: Denis Breton, 225, Ile Belairest, Rosemere Quebec (CA), J7A 1L9

( * ) Notice: Subject to any disclaimer, the term of this patent is extended or adjusted under 35 U.S.C. 154(b) by 0 days.

(21) Appl. No.: 09/119,403

(22) Filed: Jul. 21, 1998

(51) Int. Cl.[7] ...................................................... B23P 19/04
(52) U.S. Cl. ............................................................... 29/267
(58) Field of Search ............................ 29/267, 263, 280, 29/282

(56) References Cited

U.S. PATENT DOCUMENTS 2,380,068 * 7/1945 Patton .................................... 29/280
2,697,872 * 12/1954 Armstrong ............................. 29/282
4,050,136 * 9/1977 Shultz .................................... 29/263
4,280,274 * 7/1981 Filer ....................................... 29/263
5,701,650 * 12/1997 LaFleur et al. ........................ 29/282

* cited by examiner

*Primary Examiner*—Robert C. Watson

(57) ABSTRACT

A puller for extracting a member such as a bearing or bushing from a blind hole comprising an expandable split sleeve, a chuck for holding the expandable split sleeve, and a rod, the expandable split sleeve having a tubularly shaped body with an interior cavity, resilient biasing member holding the split sleeve in a closed position, and a flange proximate one end and which flange extends radially outwardly from the body, the flange terminating in a cutting edge. The rod member is insertable into the cavity and the rod and the cavity are sized that upon insertion, the rod will contact an interior wall and cause the split sleeve to expand radially outwardly. In situations wherein the puller does not have space behind the member, the cutting edge is designed to cut into and grip the member to be removed.

5 Claims, 3 Drawing Sheets

Fig. 6
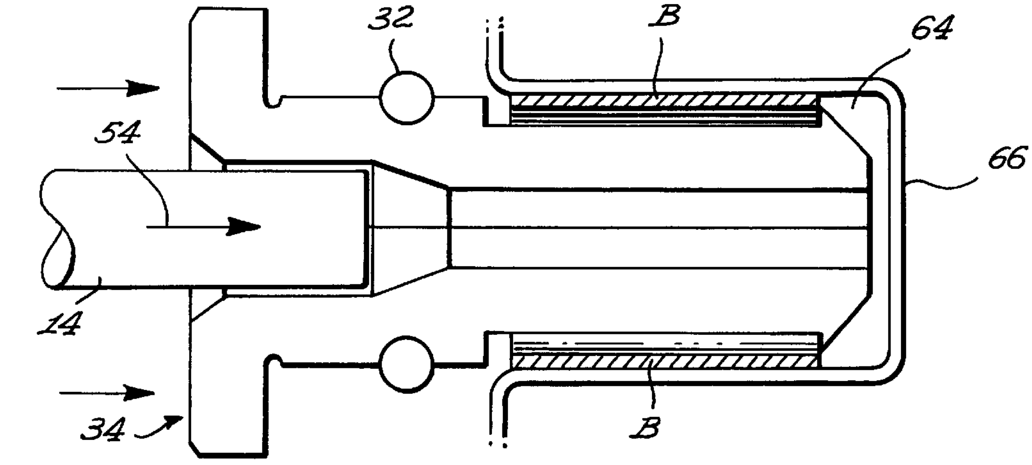
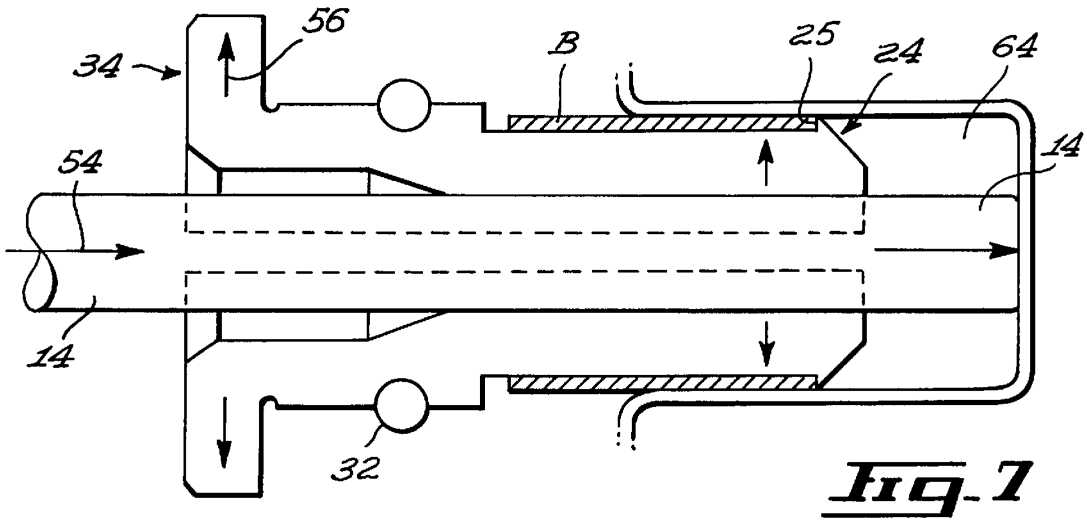
Fig. 7
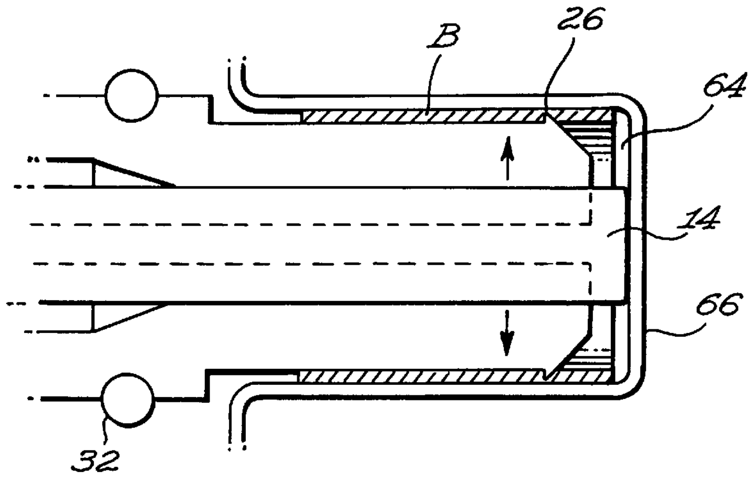
Fig. 8

EXTRACTOR TOOL

The present invention relates to an extraction device and more particularly, it relates to a puller which is suitable for extracting bushings and bearings from blind holes.

Blind holes are encountered in various mechanical structures and basically such blind holes may be defined as comprise a hole formed in a member with an open top and closed a bottom wall. Such blind holes are often fitted with inner components such as bearings, bushings, and the like. Since these inner components are usually press fitted into the blind hole, they are relatively difficult to extract therefrom. In particular, after bearings have been used for a while, they tend to become quite firmly seated. When the bearing is to be replaced, the blind hole restricts access to the bearing and removal is a problem.

There have been many suggestions in the art for extraction devices to remove such bearings or bushings from the blind hole. In the past, multiple jaw or finger pullers have been used to grasp the bearing. In addition, inclined planes have been suggested as a means of pulling the bearing out. Frequently, resort has been had to cutting torches to remove the bearing or bushing.

The prior art extractors have suffered from various limitations. Many of them are a relatively complex mechanical structure and thus relatively expensive to manufacture. Also, many of the devices rely on a shaft engaging bolt which can cause problems since the rotation of the bolt tends to cause the bolt to be laterally displaced with respect to the shaft.

A further problem associated with many prior art extractors is, in some situations, access to the member to be removed is limited and in particular, when the member does not have a space between the closed bottom wall and the member, the extractors cannot function to remove the member.

It is therefore an object of the present invention to provide an extractor of the type for extracting members from blind holes and which extractor is of a relatively simple construction.

It is a further object of the present invention to provide a puller for extracting bushings, bearings and the like, and which puller may be used in blind holes wherein there is a space behind the member to be extracted or not.

According to one aspect of the present invention, there is provided a puller for extracting bearings and bushings from a blind hold, said puller comprising an expandable split sleeve, a chuck, and a rod, the expandable split sleeve comprising a tubularly shaped body having first and second ends, a cavity defined by an interior wall extending from the first end to the second end, the body being formed of first and second axially extending body portions, resilient means biasing the first and second body portions to a closed position, a flange proximate the first end of the tubularly shaped body extending radially outwardly from the tubular shaped body, the flange terminating in a cutting edge, the chuck having means for retaining the second end of the tubularly shaped body of the split sleeve, the means for retaining the second end of the tubularly shaped body permitting radial expansion thereof, the rod member being insertable into the cavity from the second end of the tubularly shaped body, the rod and the cavity being sized such that upon insertion of the rod in the cavity the rod will contact the interior wall of the tubularly shaped body and cause the first and second body portions to expand radially outwardly.

According to a further aspect of the present invention, there is provided a device for extracting a member from a blind hole, the device comprising a housing having means for attachment to a structural member, the housing having a bore with open ends, an expandable split sleeve comprising a tubularly shaped member having first and second ends, a cavity defined by an interior wall extending from the first end to the second end, the body being formed of first and second axially extending body portions, resilient means biasing the first and second body portions to a closed position, a flange extending proximate the first end of the tubularly shaped body extending radially outwardly from the tubularly shaped body, the flange terminating in a cutting edge, a chuck having means for retaining the second end of the tubularly shaped body of the split sleeve, the means for retaining the second end of the tubularly shaped body permitting radially expansion thereof, the chuck being located proximate one end of the bore to permit access to the means for retaining the second end of the tubularly shaped body, a rod member insertable into the cavity from the second end of the tubularly shaped body, the rod and the cavity being sized such that upon insertion of the rod in the cavity, the rod will contact the interior wall of the tubularly shaped body and cause the first and second portions to expand radially outwardly and lever means mounted at the other end of the bore to exert a force on the rod member.

The puller of the present invention may be used for extracting any suitable member from a blind hole, with such members usually being a bearing or a bushing. In particular, the present invention would find wide application in the automotive field.

In a preferred embodiment, the resilient means for biasing the first and second axially extending body portions to a closed position may comprise an elastic member encircling the first and second axially extending body portions. Even more preferably, the elastic member may be an O-ring formed of a rubber or elastomeric material and which O-ring is seatable in a groove formed within an outer wall surface of the expandable split sleeve. It is desirable that the resilient biasing means be located at a position on the tubularly shaped body substantially corresponding to the point at which the rod contacts the interior wall of the tubularly shaped body.

Having thus generally described the invention, reference will be made to the accompanying drawings illustrating embodiments thereof, in which:

FIG. 6 is a view similar to FIG. 5 showing the expandable split sleeve in position prior to insertion of the rod;

FIG. 7 is a view similar to FIGS. 5 and 6 illustrating operation of the puller in removal of the member from the blind hole; and FIG. 8 is a side elevational view illustrating operation of the puller when there is little space behind the bearing or bushing.

Figure 1:
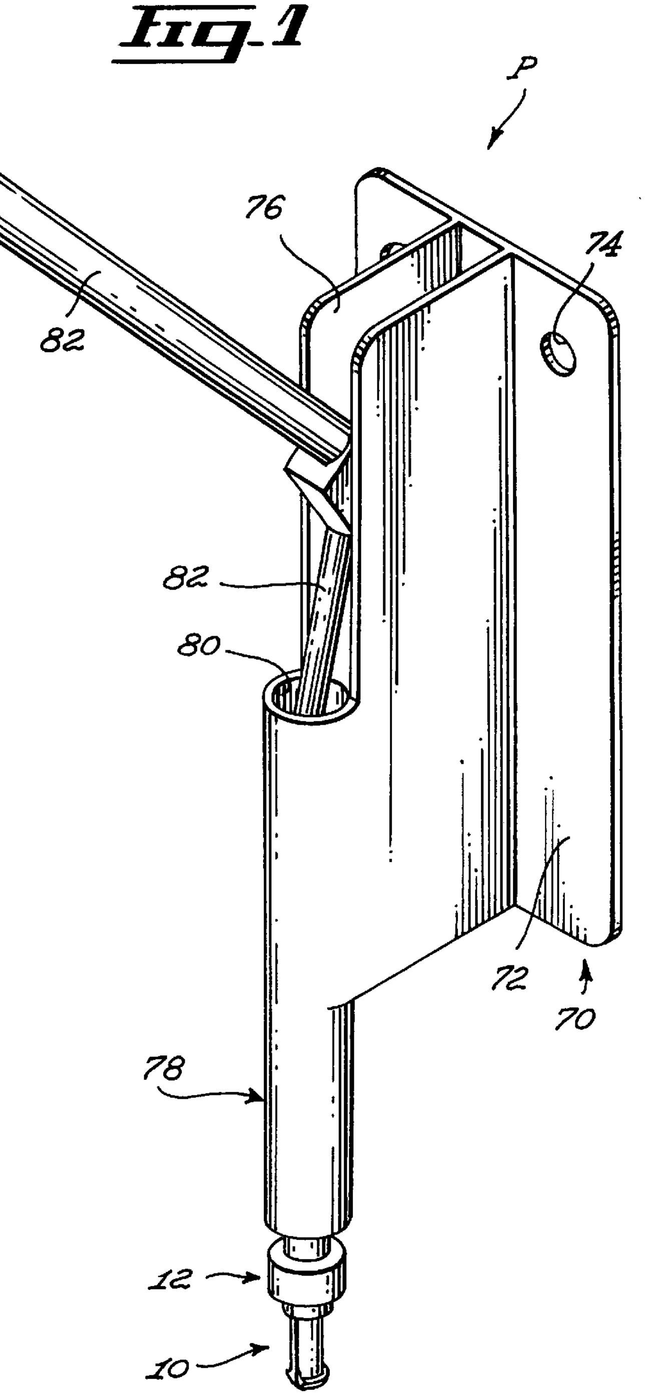
FIG. 1 is a perspective view of one embodiment of a puller for extracting bushings and bearings.

Referring to the drawings in greater detail and by reference characters thereto, there is illustrated in FIG. 1 a puller generally designated by reference character P.

Some of the operative portions of puller P are illustrated in greater detail in FIGS. 2 through 8 and reference will now be made thereto.

Figure 2:
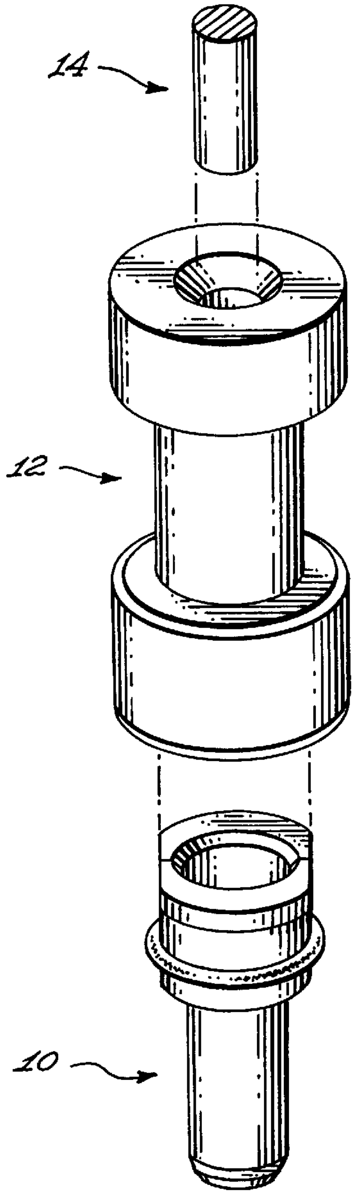
FIG. 2 is an exploded view showing a portion of the puller.

As seen in FIG. 2, puller P includes an expandable split sleeve generally designated by reference numeral 10; a chuck generally designated by reference 12, and a rod 14 which acts as the actuator for expandable split sleeve 10.

Figure 3:
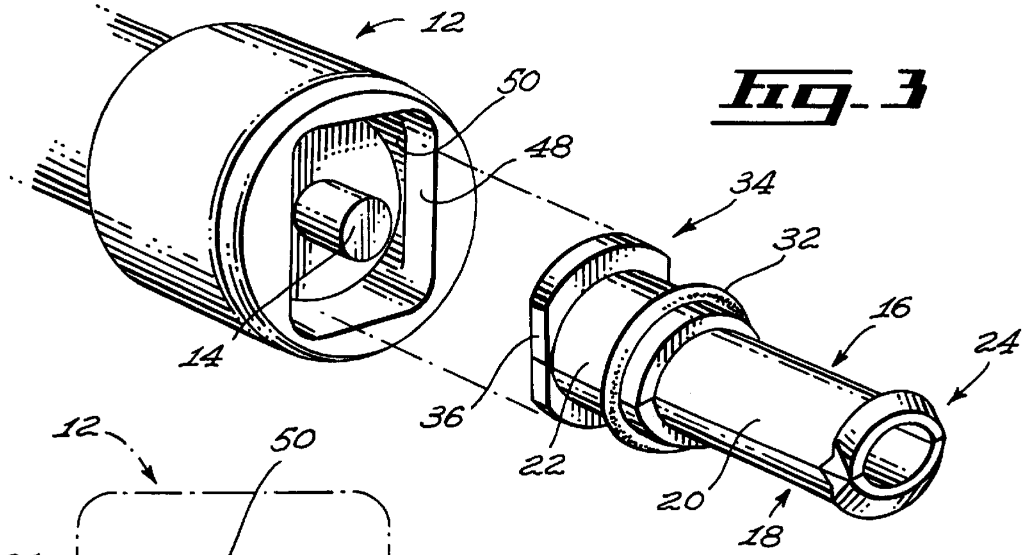
FIG. 3 is an perspective exploded view illustrating the expandable split sleeve and chuck for retaining the same.
Figure 4:
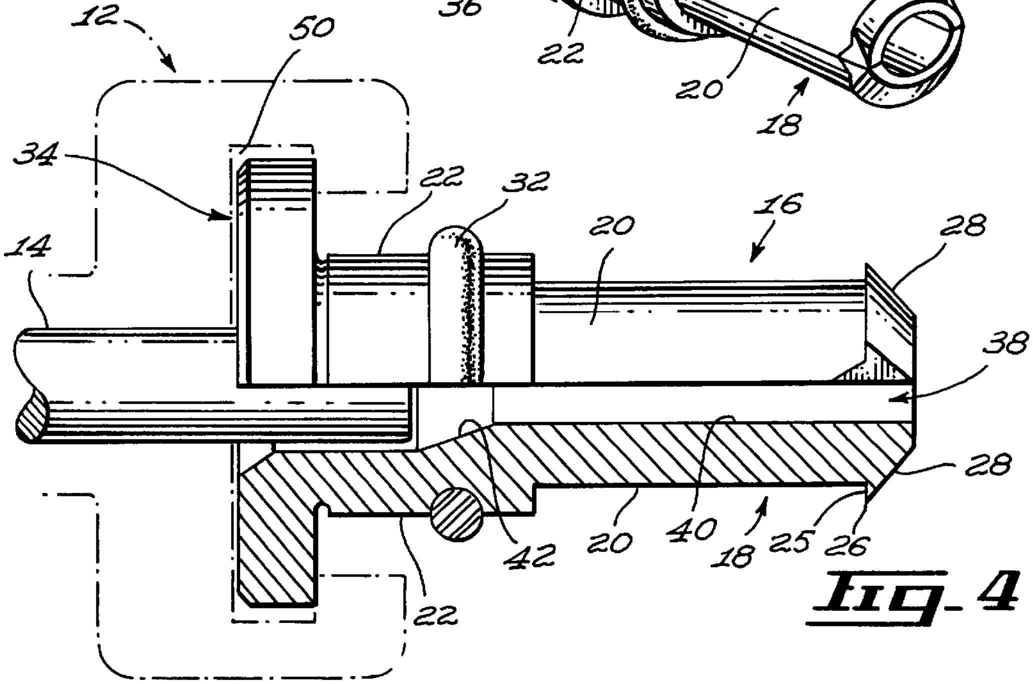
FIG. 4 is a side view, partially in section, illustrating the expandable split sleeve prior to insertion into the blind bolt.

Referring to FIGS. 3 and 4, it will be seen that expandable split sleeve 10 is formed of first and second axially extending body portions 16 and 18 respectively. Each body portion 16, 18 is of a substantially identical structure and thus each half will not be described in detail herein, rather the whole of the structure will be referred to. As may be seen in FIG. 3, body portions 16, 18 are of a somewhat hemispherical outline in cross sectional configuration, but do not extend to the full 180 degrees. Thus, the split sleeve end has a somewhat oval shape when seen in a cross sectional view.

Expandable split sleeve 10 includes a first outer wall section 20 having a substantially uniform diameter and a second outer wall section generally designated by reference numeral 22 and which second outer wall section 22 also has a substantially uniform diameter which is larger than the diameter of first outer wall section 20.

Located adjacent an end of first outer wall section 20 is an outwardly extending flange generally designated by reference numeral 24. Flange 24, as may be best seen in FIG. 4, is defined by a radially extending wall 25 which terminates in a cutting edge 26. From cutting edge 26, there is provided a forwardly bevelled wall surface 28.

Second outer wall section 22 has a groove 30 formed therein, with groove 30 being designed to receive O-ring 32. The O-ring thus functions to bias first body portion 16 and second body portion 18 together to a closed position. Located at the end of expandable split sleeve 10 opposed to flange 24 is a second outwardly extending annular flange generally designated by reference numeral 34. As will be seen in FIG. 3, flange 34 is provided with flat side wall sections 36 for reasons which will become apparent hereinbelow. Chuck 12 has an open end portion thereof sized to receive flange 34 of expandable split sleeve 10. As shown in FIG. 3, there is also provided an undercut recess 50 behind side walls 50. Thus, when expandable split sleeve 10 is inserted within chuck 12, it may be rotated to 90 degrees and flange 34 will thus lock in undercut recess 50 and split sleeve 10 retained in position.

Formed between first body portion 16 and second body portion 18 is a centrally located cavity generally designated by reference numeral 38. Cavity 38 is defined by a first wall section 40 which is of a substantially uniform cross sectional configuration and by a second converging wall section 42 which is of a decreasing cross sectional area in the direction extending towards flange 24. It will be noted that converging wall section 42 and groove 30 are located opposite each other.

Figure 5:
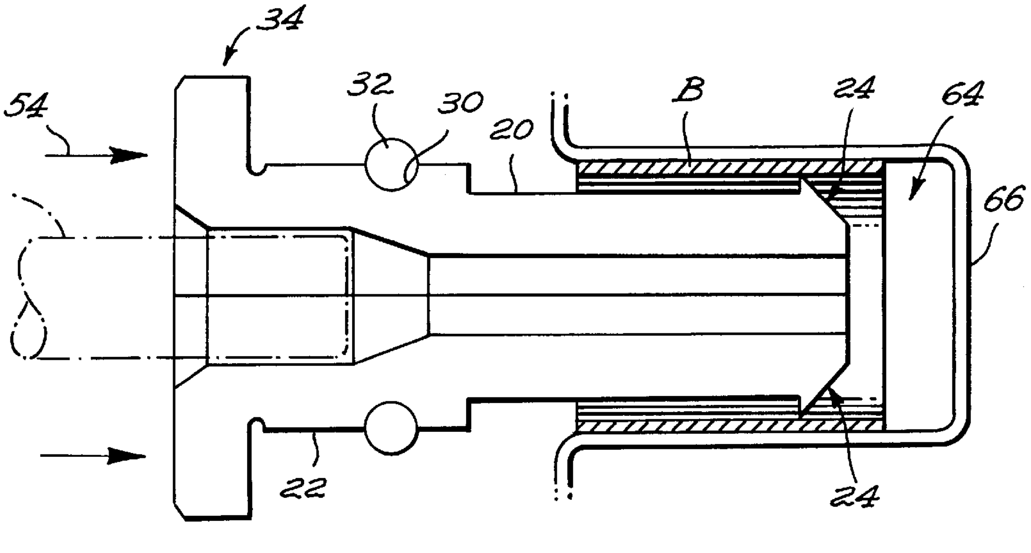
FIG. 5 is a side elevational view showing insertion of the expandable split sleeve into the blind hole to remove a member therefrom.

In operation, after expandable split sleeve 10 has been inserted within chuck 12 and rotated to a locked in position, split sleeve 10 is inserted within a blind hole 64 having a closed back wall 66 and having a member B which is to be removed (normally a bearing or bushing). This insertion in the direction of arrows 54 is illustrated in FIG. 5.

A tool utilizing the puller of the present invention is shown in FIG. 1 and reference will now be made thereto.

As shown in FIG. 6, split sleeve 10 is inserted until flange 24 is located on the back side of bearing or bushing B. Subsequently, rod 12 is urged forwardly as indicated by arrow 54. Rod 12 will contact converging walls 42 and urge first body portion 16 and second portion 18 to a spaced apart configuration as shown in FIG. 7 and indicated by arrows 56. In this configuration, wall 25 engages the back edge of the bearing. Continued force on rod 14 will cause the same to contact back wall 66 and cause withdrawal of bearing or bushing B.

FIG. 8 illustrates an arrangement wherein blind hole 64 does not have enough space behind member B to permit flange 24 to be inserted to the depth required to permit walls 25 to engage the end of bearing or bushing B. As shown in FIG. 8, in this instance, actuation of rod 14 can cause cutting edge 26 to cut into bearing or bushing B. This will permit the necessary grip to withdraw the bearing or bushing from the blind hold.

A tool utilizing the puller of the present invention is shown in FIG. 1 and reference will now be made thereto. The tool or device includes a housing 70 which has a back plate 72 with apertures 74 formed therein for mounting, to a suitable structural support. Although the present invention can be utilized either in the horizontal or vertical planes, it is generally preferred that the plate 72 be mounted on a vertical support.

Extending outwardly from back plate 72 are a pair of flanges 76. Extending downwardly is a tubular portion 78 having a bore 80.

Chuck 12 is mounted in the bottom end of bore 80 such that access may be had thereto for insertion of split sleeve 10 as shown in FIG. 4. Attached to rod 14 in bore 80 is a lever 82 which in turn is connected to a rotatably journalled member 86. A handle 84 can then be pressed downmwardly to permit the exertion of a force on rod 14.

It will be understood that the above described embodiments are for purposes of illustration only and that changes and modifications may be made thereto without departing from the spirit and scope of the invention.

I claim:

1. A device for extracting a component from a blind hole wherein a back wall prevents access to said component, said device comprising:

a housing having means for attachment to a structural member, said housing having a bore with open ends;

an expandable split sleeve comprising a tubularly shaped member having first and second ends, a cavity defined by an interior wall extending from said first end to said second end, said body being formed of first and second axially extending body portions, component engaging means proximate said first end of said tubularly shaped body extending radially outwardly front said tubularly shaped body;

a chuck mounted within said bore, said chuck having means for retaining said second end of said tubularly shaped body of said split sleeve, said means for retaining said second end of said tubularly shaped body permitting radial expansion thereof, said chuck being located proximate one end of said bore to permit access to said means for retaining said second end of said tubularly shaped body;

a rod member insertable into said cavity from said second end of said tubularly shaped body, said rod and said cavity being sized such that upon insertion of said rod in said cavity, said rod will contact said interior wall of said tubularly shaped body and cause said first and second portions to expand radially outwardly such that said component engaging means will engage said component and permit said rod to pass through said cavity to contact said back wall; and lever means mounted at said other end of said bore to exert a force on said rod member.

2. The puller of claim 1 wherein said component engaging means comprises a flange formed by a first radially extending wall terminating in a cutting edge, and a bevelled wall extending from said cutting edge to said first end of said tubularly shaped body.

3. The puller of claim 2 further including resilient means biasing said first and second axially extending body portions to a closed position, said resilient means comprising an elastic member encircling said first and second axially extending body portions.

4. The puller of claim 3 wherein said interior wall defining said cavity includes a converging wall section and a substantially constant diameter wall section, said converging wall section converging inwardly from said second end of said tubularly shaped body towards said first end of said tubularly shaped body, said relatively constant diameter wall section extending from said converging wall section to said second end of said tubularly shaped body.

5. The puller of claim 4 wherein said resilient means biasing said first and second axially extending body portions to a closed position comprises an elastic member encircling said first and second axially extending body portions, said elastic member being positioned proximate said converging wall section.

* * * * *